United States Patent
Gibbons et al.

(10) Patent No.: US 9,021,150 B2
(45) Date of Patent: Apr. 28, 2015

(54) STORAGE DEVICE SUPPORTING PERIODIC WRITES WHILE IN A LOW POWER MODE FOR AN ELECTRONIC DEVICE

(71) Applicant: Western Digital Technologies, Inc., Irvine, CA (US)

(72) Inventors: Kent W. Gibbons, Yorba Linda, CA (US); Dean V. Dang, Fountain Valley, CA (US); Colin W. Morgan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/047,955

(22) Filed: Oct. 7, 2013

(65) Prior Publication Data

US 2015/0058499 A1 Feb. 26, 2015

Related U.S. Application Data

(60) Provisional application No. 61/869,564, filed on Aug. 23, 2013.

(51) Int. Cl.
*G06F 3/00* (2006.01)
*G06F 3/06* (2006.01)

(52) U.S. Cl.
CPC ............ *G06F 3/0634* (2013.01); *G06F 3/0625* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,631,469 B1 | 10/2003 | Silvester | |
| 7,239,468 B2 | 7/2007 | Murai et al. | |
| 8,009,378 B2 | 8/2011 | Kurashige et al. | |
| 8,281,169 B2 | 10/2012 | Borras et al. | |
| 2003/0208701 A1 | 11/2003 | Watari et al. | |
| 2005/0138296 A1* | 6/2005 | Coulson et al. | 711/141 |
| 2008/0024899 A1* | 1/2008 | Chu et al. | 360/69 |
| 2009/0063839 A1 | 3/2009 | Bhogal et al. | |
| 2010/0250989 A1 | 9/2010 | Hamilton | |
| 2011/0202707 A1 | 8/2011 | Moon et al. | |
| 2012/0042182 A1* | 2/2012 | Fulkerson et al. | 713/320 |

OTHER PUBLICATIONS

International Search Report and Written Opinion dated Dec. 2, 2014 from related PCT Serial No. PCT/US2014/052198, 9 pages.

* cited by examiner

*Primary Examiner* — Chun-Kuan Lee
*Assistant Examiner* — David Martinez

(57) ABSTRACT

A storage device including a non-volatile memory configured to store data from a host, and a controller. The controller is configured to detect when the host is in a low power periodic update mode, the detecting based at least on part on a timing of a communication from the host, and place the storage device in a power up in standby mode when the host is in the low power periodic update mode.

17 Claims, 3 Drawing Sheets

STORAGE DEVICE SUPPORTING PERIODIC WRITES WHILE IN A LOW POWER MODE FOR AN ELECTRONIC DEVICE

CROSS-REFERENCE TO RELATED APPLICATIONS

This application claims the benefit of U.S. Provisional Application No. 61/869,564, filed on Aug. 23, 2013, entitled "STORAGE DEVICE SUPPORTING PERIODIC WRITES WHILE IN A LOW POWER MODE FOR AN ELECTRONIC DEVICE," which is hereby incorporated by reference in its entirety.

BACKGROUND

Conventional laptops have a limited amount of power available to them. However, a user may wish to update data while in the laptop, such as by getting e-mails or updates on social network applications. Such a process often required that the user power on the laptop to receive the e-mails or the updates. This can drain the power of the laptop. When the battery in the laptop is drained, then the user generally has to charge the laptop by plugging the laptop into a power outlet. This can limit the portability of the laptop.

Alternatively, the user may have a spare battery. However, the spare battery can be heavy and it may be inconvenient for the user to carry around the spare battery along with the laptop. Furthermore, in some situations, the spare battery may not be available for the laptop, such as when the battery of the laptop is integrated with the laptop or is not removable by a user.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
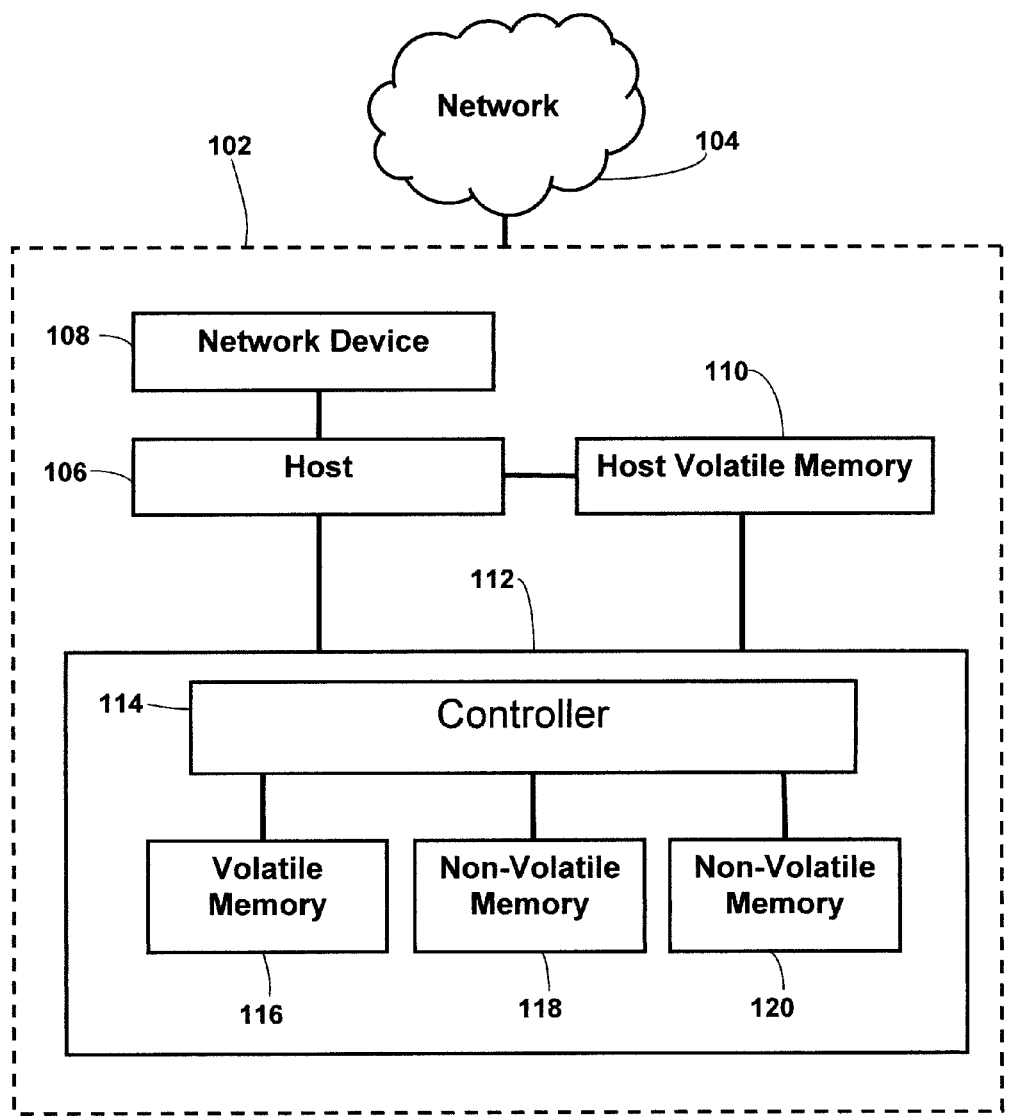
FIG. 1 depicts an electronic device configured to be connected to a network according to an embodiment.

In an embodiment, an electronic device 102 is configured to be connected to a network 104. The network 104 can be, for example, the Internet, a local area network ("LAN"), a wide area network ("WAN"), or any other network which may contain data which the electronic device 102 may wish to access.

In an embodiment, the electronic device 102 comprises a host 106, a network device 108, a host volatile memory 110, and a storage device 112. In an embodiment, the electronic device 102 can comprise, for example, a laptop, a set top box (e.g., DVR), or other electronic device where the electronic device and/or the host 106 can be configured to operate in a low power periodic update mode, which will be described in more detail below. In an embodiment, the laptop comprises a subnotebook wherein the battery in the subnotebook is non-removable by a user. In an embodiment, the laptop comprises an ultrabook.

In an embodiment, the host 106 is configured to be in the low power periodic update mode, a sleep mode, or an active mode. In an embodiment, the low power periodic update mode comprises iSCT (Intel Smart Connect Technology). In an embodiment, the sleep mode comprises a low power mode. In an embodiment, the active mode comprises a normal power mode. In an embodiment, the sleep mode comprises a reduced power mode relative to the active mode.

In an embodiment, the host volatile memory 110 can comprise, for example, dynamic random access memory ("DRAM"). In an embodiment, the host volatile memory 110 can be configured to be utilized by the host 106. In an embodiment, the network device 108 is configured to connect the electronic device 102 to the network 104. For example, the network device 108 can facilitate the reception of network data from the network 104. In an embodiment, the network 104 comprises a wired or wireless network. The network device 108 can, for example, be configured to connect with a cloud service.

In an embodiment, the storage device 112 comprises a controller 114, a volatile memory 116, a non-volatile memory 118, and optionally, a non-volatile memory 120. In an embodiment, the volatile memory 116 comprises a cache memory. For example, the volatile memory 116 can comprise DRAM. In an embodiment, the non-volatile memory 118 and the non-volatile memory 120 can each comprise a rotating magnetic media or a solid state memory. For example, the storage device 112 may be a hard disk drive, a hybrid disk drive, or a solid state drive. Furthermore, although the non-volatile memory 118 and 120 are shown in FIG. 1, additional non-volatile memory may also be utilized.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In an embodiment, while the host 106 is in the low power periodic update mode, the host 106 wakes the electronic device 102 periodically from the sleep mode, and re-establishes network connectivity. This enables applications that receive data from the Internet, such as e-mail and social network applications, to quickly synchronize with a cloud service. After the content is updated, the host 106 automatically transitions back to the sleep mode. In an embodiment, additional applications instead of e-mail and social network applications may be utilized along with their corresponding data.

In an embodiment, this allows a user to see updates for e-mail or a social network application when waking up the electronic device without having to wait to download all of the updated data. For example, if the electronic device is a laptop, the user can close the laptop to put the laptop to sleep. While the laptop is asleep, the laptop will periodically wake up and download the data from the Internet for applications such as e-mail and a social network application. That is, new e-mails or social network application data since the user closed the laptop will be downloaded by the laptop. When the user opens up the laptop to wake up the laptop so he can use the laptop, the e-mails and the social application data will be available for the user to view. The user does not have to wait to download all of the e-mails or social application data after he opens up the laptop and wakes up the laptop.

In an embodiment, when the host 106 is in the low power periodic update mode, it is capable of sending an identify drive command to the storage device 112 within 1 ms of waking up from the sleep mode. In an embodiment, the identify drive command comprises an Advancement Technology Attachment ("ATA") identify drive command. On the other hand, in an embodiment, when the host 106 is not in the low power periodic update mode, such as when the host 106 is in the active mode, the host 106 may go through a much longer initialization phase, relative to the lower power periodic update mode, before it is capable of sending an identify drive command to the storage device 112.

In an embodiment, the initialization phase utilizes an initialization time period. In an embodiment, the initialization time period comprises approximately between 800 ms to 8000 ms. The much faster timing when the host 106 is in the low power periodic update mode may be due to the fact that the host 106 is already aware of the devices attached to it and does not need to undergo an enumeration process to initialize those devices.

Figure 2:
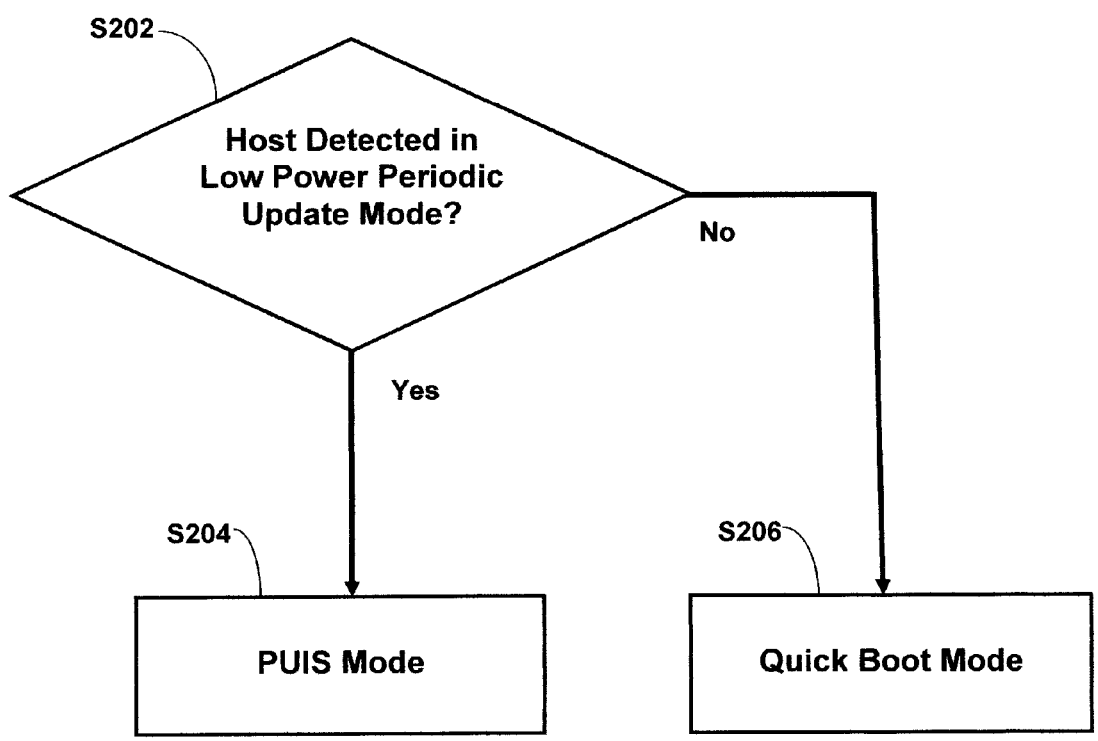
FIG. 2 depicts a process according to an embodiment.

In an embodiment, the controller 114 in the storage device 112 is configured to determine whether the host 106 is in the low power periodic update mode or not in order to determine whether to place the storage device 112 in a power up in standby ("PUTS") mode or not as shown in an embodiment in FIG. 2.

In block S202, the controller 114 detects whether the host 106 is in the low power periodic update mode. In an embodiment, the controller 114 in the storage device 112 takes advantage of a timing difference between the low power periodic update mode and the active mode to make such a determination. In an embodiment, the controller 114 detects when the host 106 is in the low power periodic update mode based at least on part on a timing of a communication from the host 106. For example, the controller 114 can detect when the host 106 is in the low power periodic update mode by determining an amount of time between when the storage device 112 is powered up and when the identify drive command is received from the host 106. In an embodiment, the controller 114 detects that the host 106 is in the low power periodic update mode when the amount of time between when the storage device 112 is powered up and when the identify drive command is received from the host 106 is less than the predetermined amount of time threshold. In an embodiment, the predetermined amount of time threshold comprises approximately 10 ms.

In block S204, the controller 114 places the storage device 112 into the PUTS mode if the host 106 is detected to be in the low power periodic update mode. For example, the controller 114 in the storage device 112 can automatically place the storage device 112 into the PUTS mode if an identify drive command is received from the host 106 within the predetermined amount of time threshold from power up of the storage device 112.

In an embodiment, the storage device 112 may report ready to the host within 100's of ms of power being applied. In an embodiment, the storage device 112 may not require that the PUIS mode be explicitly turned on/off.

Thus, in an embodiment, the controller 114 in the storage device 112 determines by the timing of the identify drive command, the mode of operation of the host (whether it is in low power periodic update mode or not), and automatically puts the storage device into the PUIS mode accordingly.

When the controller 114 in storage device 112 detects that the host 106 is in low power periodic update mode (such as via the timing inference), the controller 114 can load flash and ready the storage device 112 to accept host commands. For example, the storage device 112 can accept host commands when the set features command is sent from the host 106 to spin-up the rotating magnetic media in the non-volatile memory 118 or 120 in the storage device 112. However, the rotating magnetic media may not spin-up on this command.

In block S206, if the controller 114 detects that the host 106 is not in the low power periodic update mode, the controller 114 places the storage device 112 in the quick boot mode. For example, if the host 106 does not send an identify drive command within the predetermined amount of time threshold, then the storage device 112 goes to a normal quick boot mode (with spin-up to follow). The storage device 112 then proceeds to its normal 2 second spin-up post process (load full flash and read reserved files). In an embodiment, the performance risk for going into low power periodic update mode is relatively low because the storage device firmware can initialize the storage device 112 for full operation when the Set Features spin-up command is received and not return until the rotating magnetic media is ready.

Figure 3:
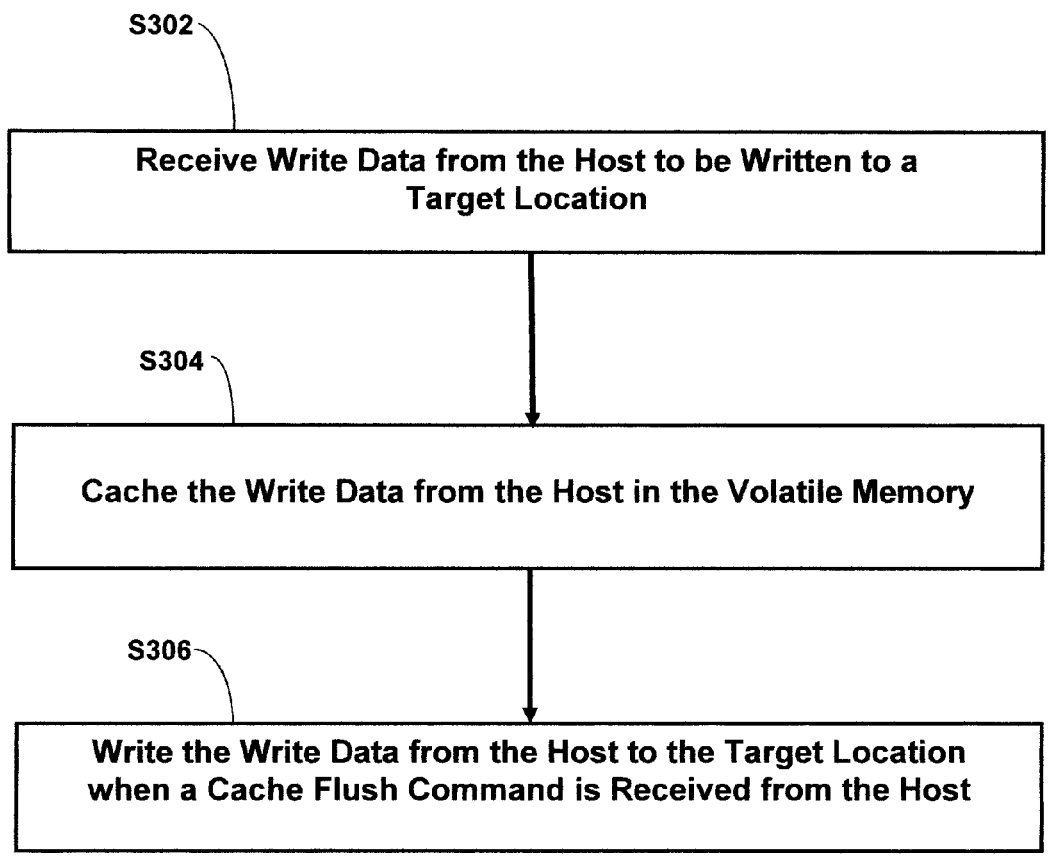
FIG. 3 depicts a process according to an embodiment.

In an embodiment, once the controller 114 determines that the host 106 is in the low power periodic update mode, the controller 114 can cache up data to be written to a target location as shown in an embodiment in FIG. 3. In block S302, the controller 114 receives write data from the host 106 to be written to a target location such as the storage device 112 (e.g., non-volatile memory 118 or 120 in the storage device 112), or the host volatile memory 110 (in the case where a driver is used).

In an embodiment, the data to be written can be data from the network device 108 which is periodically updated, and which is to be written to the target location. In an embodiment, the host 106 can facilitate this data to be written by transmitting it to the storage device 112.

In an embodiment, the host 106 transmits data to the storage device 112 at a first data rate (which may be relatively slow due to the fetching of data from remote network(s), as limited by network connection speed(s)), while the storage device 112 is configured to write data to the rotating magnetic media in the non-volatile memory 118 or 120 at a second data rate greater than the first data rate. Similarly, in a storage device 112 with solid state memory in the non-volatile memory 118 or 120, the second data rate of writing to the solid state memory would also far exceed the first data rate.

In an embodiment, the target location for data to be written can be the non-volatile memory 118 or 120 of the storage device 112, such as the rotating magnetic media or the solid state memory of the storage device 112. In an embodiment, the target location can comprise the host volatile memory 110.

In block S304, the controller can cache the write data from the host 106 in the volatile memory 116. For example, if the target is the non-volatile memory 118 or 120, the data can be cached in the volatile memory 116 instead of being written directly to the non-volatile memory 118 or 120. In an embodiment, by caching the data to be written instead of directly writing the data to the target location, the data to be written can be accumulated.

In an embodiment, the data to be written comprises data to be written in logical block addresses ("LBAs"). In an embodiment, writes can still go to the non-volatile memory 118 or 120 as the controller 114 will cache up writes into the volatile memory 116, and can leverage the same volatile memory accumulate feature to execute the write.

In an embodiment, once all of the data to be written has been transmitted, the host can issue a cache flush command to the storage device 112, or other command/signal indicating that the data to be written has all been transferred, or that the host 106 has concluded the fetching of data and will resume a lower power state. In block S306, the controller 114 in the storage device 112 can flush the accumulated data in the volatile memory 116 to the target location when the cache flush command is received from the host 106. In an embodiment, the controller 114 can flush the accumulated data in the volatile memory 116 when the controller receives other commands/signals from the host 106 indicating that the data to be written has all be transferred from the host 106. In an embodiment, the controller 114 can flush the accumulated data in the volatile memory 116 when the controller 114 receives an indication from the host 106 that the host 106 has concluded the fetching of data and will resume a lower power state.

Thus, in an embodiment where the target location comprises the rotating magnetic media, such as when the non-volatile memory 118 or 120 comprises the rotating magnetic media, the rotating magnetic media does not need to be spinning while the data is being accumulated for write in the target location due to the differential between the second data rate and the first data rate. Due to the higher second data rate, the flush of the accumulated data can be written very quickly, requiring a short power-on time of the rotating magnetic media. In an embodiment, the controller 114 may prevent the rotating magnetic media from spinning up when the storage device 112 is in the PUTS mode, until the cache flush command is received form the host 106, or data stored in the rotating magnetic media is requested by the host for a read command. In an embodiment, this can reduce power consumption of the storage device 112 by reducing an amount of time that the rotating magnetic media is spinning.

In an embodiment, where the target location comprises the solid state memory, such as when the non-volatile memory 118 or 120 comprises the solid state memory, the solid state memory may not need to periodically write small amounts of data while the data is being fetched by the host 106. Thus, the flush to the solid state memory can also be performed quickly. In an embodiment, this can reduce power consumption of the storage device 112 by reducing an amount of time that a write circuit in the solid state memory is on.

In an embodiment, this allows for the host 106 in a low power periodic update mode to wake up the storage device 112 to receive data updates without requiring the storage device 112 to spin-up the rotating magnetic media. In an embodiment, the rotating magnetic media will only spin-up if the read is not in solid state memory (in the case of a hybrid drive storage device) and the rotating magnetic media needs to be accessed to obtain data for the read command.

If access to the rotating magnetic media is needed nonetheless, the storage device 112 may hold off the host for 2 seconds to allow for the spin-up to complete. In an embodiment this ensures that write/smart enable commands get routed to the volatile memory 116 in the storage device 112, so the commands are executed later after the rotating magnetic media completes a spin-up as a result of a host 106 cache flush/standby command. In an embodiment, this can enable a storage device 112 to receive full benefits of a low power periodic update mode, provide full low power periodic update support, and still maintain post ready within a predetermined amount of time. In an embodiment, the predetermined amount of time comprises 2 seconds. However, in an embodiment, the predetermined amount of time can comprise other times. Furthermore, many systems only have one serial advance technology attachment ("SATA") port. Thus, this may allow such systems to meet all the requirements to support a low power periodic update mode on a single device utilizing both solid state memory and rotating magnetic media.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage device comprising:
   a non-volatile memory configured to store data from a host; and
   a controller configured to:
      detect when the host is in a low power periodic update mode at least in part by:
         receiving an identify drive command from the host; and
         determining that an amount of time between when the storage device is powered up and when the identify drive command is received from the host is less than a predetermined amount of time; and
      place the storage device in a power up in standby mode in response to said detecting that the host is in the low power periodic update mode;
   wherein the identify drive command comprises a request for identification information associated with the storage device.

2. The storage device of claim 1 further comprising a volatile memory, wherein when the storage device is in the power up in standby mode, the controller is further configured to:
receive write data from the host to be written to a target location;
cache the write data from the host in the volatile memory; and
write the write data from the host to the target location when a cache flush command is received from the host.

3. The storage device of claim 2 wherein the non-volatile memory further comprises a rotating magnetic media, wherein when the storage device is in the power up in standby mode, the controller is further configured to:
prevent the rotating magnetic media from spinning up until the cache flush command is received from the host or data stored in the rotating magnetic media is requested by the host for a read command.

4. The storage device of claim 2 wherein the target location comprises the non-volatile memory.

5. The storage device of claim 2 wherein the target location comprises a host volatile memory.

6. The storage device of claim 1 wherein the non-volatile memory further comprises a rotating magnetic media, and the controller is further configured to:
place the storage device in a quick boot mode when the host is not in the low power periodic update mode; and
spin up the rotating magnetic media when the storage device is in the quick boot mode.

7. The storage device of claim 1 further comprising a plurality of non-volatile memory, the plurality of non-volatile memory comprising at least a rotating magnetic media and at least a solid state memory.

8. A method for operating a storage device comprising:
detecting when a host connected to the storage device is in a low power periodic update mode using a controller in the storage device at least in part by:
receiving an identify drive command from the host; and
determining that an amount of time between when the storage device is powered up and when the identify drive command is received from the host is less than a predetermined amount of time; and
placing the storage device in a power up in standby mode using the controller in response to said detecting that the host is in the low power periodic update mode;
wherein the identify drive command comprises a request for identification information associated with the storage device.

9. The method of claim 8 further comprising:
receiving write data from the host to be written to a target location when the storage device is in the power up in standby mode;
caching the write data from the host in a volatile memory in the storage device when the storage device is in the power up in standby mode; and
writing the write data from the host to the target location when a cache flush command is received from the host.

10. The method of claim 9 further comprising:
preventing a rotating magnetic media in a non-volatile memory in the storage device from spinning up when the storage device is in the power up in standby mode, until the cache flush command is received from the host or data stored in the rotating magnetic media is requested by the host for a read command, wherein the non-volatile memory is configured to store host data.

11. The method of claim 9 wherein the target location comprises a non-volatile memory in the storage device.

12. The method of claim 9 wherein the target location comprises a host volatile memory.

13. The method of claim 8 further comprising:
placing the storage device in a quick boot mode when the host is not in the low power periodic update mode; and
spinning up a rotating magnetic media in a non-volatile memory in the storage device when the storage device is in the quick boot mode.

14. An electronic device comprising:
a host configured to be in a low power periodic update mode;
a network device configured to periodically receive network data from a network when the host is in the low power periodic update mode; and
a storage device comprising:
a non-volatile memory configured to store data from the host; and
a controller configured to:
detect when the host is in the low power periodic update mode at least in part by:
receiving an identify drive command from the host; and
determining that an amount of time between when the storage device is powered up and when the identify drive command is received from the host is less than a predetermined amount of time; and
place the storage device in a power up in standby mode in response to said detecting that the host is in the low power periodic update mode;
wherein the identify drive command comprises a request for identification information associated with the storage device.

15. The electronic device of claim 14 wherein the storage device further comprises a volatile memory, and when the storage device is in the power up in standby mode, the controller is further configured to:
receive write data from the host to be written to a target location, wherein the write data comprises at least part of the network data received by the network device;
cache the write data from the host in the volatile memory; and
write the write data from the host to the target location when a cache flush command is received from the host.

16. The electronic device of claim 15 wherein the non-volatile memory further comprises a rotating magnetic media, wherein when the storage device is in the power up in standby mode, the controller is further configured to:
prevent the rotating magnetic media from spinning up until the cache flush command is received from the host or data stored in the rotating magnetic media is requested by the host for a read command.

17. The electronic device of claim 14 wherein the non-volatile memory further comprises a rotating magnetic media, and the controller is further configured to:
place the storage device in a quick boot mode when the host is not in the low power periodic update mode; and
spin up the rotating magnetic media when the storage device is in the quick boot mode.

* * * * *